US008543533B2

(12) United States Patent
Lozano et al.

(10) Patent No.: US 8,543,533 B2
(45) Date of Patent: Sep. 24, 2013

(54) INFERRING INFLUENCE AND AUTHORITY

(75) Inventors: Aurelie C. Lozano, Scarsdale, NY (US);
Vikas Sindhwani, Hawthorne, NY (US)

(73) Assignee: International Business Machines Corporation, Armonk, NY (US)

(*) Notice: Subject to any disclaimer, the term of this patent is extended or adjusted under 35 U.S.C. 154(b) by 284 days.

(21) Appl. No.: 12/960,106

(22) Filed: Dec. 3, 2010

(65) Prior Publication Data

US 2012/0143815 A1    Jun. 7, 2012

(51) Int. Cl.
*G06N 5/04*    (2006.01)
(52) U.S. Cl.
USPC .................................... 706/58; 707/723
(58) Field of Classification Search
None
See application file for complete search history.

(56) References Cited

U.S. PATENT DOCUMENTS

| | | | |
|---|---|---|---|
| 8,145,745 B1* | 3/2012 | Ge et al. | 709/224 |
| 2007/0214097 A1* | 9/2007 | Parsons et al. | 706/12 |
| 2008/0228446 A1* | 9/2008 | Baraniuk et al. | 702/189 |
| 2010/0205138 A1* | 8/2010 | Zhang et al. | 706/52 |
| 2011/0028827 A1* | 2/2011 | Sitaram et al. | 600/410 |
| 2011/0055132 A1* | 3/2011 | Mahdian et al. | 706/46 |
| 2011/0112998 A1* | 5/2011 | Abe et al. | 706/13 |
| 2011/0131162 A1* | 6/2011 | Kaushal et al. | 706/13 |
| 2011/0167031 A1* | 7/2011 | Kleinberg et al. | 706/52 |
| 2012/0117059 A1* | 5/2012 | Bailey et al. | 707/723 |
| 2012/0262165 A1* | 10/2012 | Griswold et al. | 324/309 |
| 2012/0262166 A1* | 10/2012 | Griswold et al. | 324/309 |

OTHER PUBLICATIONS

Lozano A. et al., "Group Orthogonal Matching Pursuit for Variable Selection and Prediction", Advanced in Neural Information Processing Systems (NIPS), 22, pp. 1-9, 2009.*
Lozano A. et al., "Spatial-temporal Causal Modeling for Climate Change Attribution", KDD'09, Jun. 28-Jul. 1, 2009, Paris, France, pp. 587-595.*
Lozano A. et al., "Block Variable Selection in Multivariate Regression and High-dimensional Causal Inference", Advanced in Neural Information Processing Systems, pp. 1-9, 2010. (Although date, authors, and assignee precludes this as a viable reference, it is nonetheless included here, since it pointedly pertains to the applicants invention).*
Lozano A. et al., "Grouped Graphical Granger Modeling Methods for Temporal Causal Modeling", KDD'09, Jun. 28-Jul. 1, 2009, Paris, France, pp. 577-585.*
Arnold A. et al., "Temporal Causal Modeling with Graphical Granger Methods", KDD'07 Aug. 12-15, 2007, San Jose, California, USA, pp. 66-75.*
Agarwal N. et al., "Identifying the Influential Bloggers in a Community", WSDM'08, Feb. 11-12, 2008, pp. 207-217.*
Turlach B. et al., "Simultaneous Variable Selection", Technometrics, 47, No. 3, 2005.*
Deshpande G. et al., "Multivariate Granger Causality Analysis of fMRI Data", Human Brain Mapping, 30, pp. 1361-1373, 2009.*

(Continued)

*Primary Examiner* — Jeffrey A Gaffin
*Assistant Examiner* — Dave Misir
(74) *Attorney, Agent, or Firm* — Scully, Scott, Murphy & Presser, P.C.; Daniel P. Morris, Esq.

(57) ABSTRACT

A computer model finds an originating community member or members, for instance amongst bloggers, scientific researchers, or phenomena in phenomenological systems. In one embodiment, non-explicit causal relationships may be inferred from comparing blogs as a whole. Influence relationships are derived from a weighted, directed graph output and sources of influence are ranked. This implementation is useful for a variety of applications.

23 Claims, 8 Drawing Sheets

(56) References Cited

OTHER PUBLICATIONS

Eiter T. et al., "Complexity results for structure-based causality", Artificial Intelligence, 142, 2002, pp. 53-89.*

Argyriou et al., "Convex multi-task feature learning", Springer Science+Business Media, LLC (2008), pp. 243-272, Jan. 9, 2008.

Bedrick et al., "Model Selection for Multivariate Regression in Small Samples", Biometrics, Mar. 1994, p. 226.

Breiman et al., "Predicting Multivariate Responses in Multiple Linear Regression", Journal of the Royal Statistical Society, Series B (Methodological), vol. 59, No. 1 (1997), pp. 3-54; http://www.jstor.org/Tue May 24 10:43:34 2005.

Enders, "Applied Econometric Time Series", John Wiley & Sons, 2003.

Fletcher et al., "Orthogonal Matching Pursuit from Noisy Measurements: A New Analysis", NIPS, 2009, pp. 1-9.

Frank et al., "A Statistical View of Some Chemometrics Regression Tools", Technometrics, vol. 35, No. 2. p. 109, May 1993.

Friedman et al., "Sparse inverse covariance estimation with the graphical lasso", Biostatistics (2008), 9, 3, pp. 432-441, Advance Access publication on Dec. 12, 2007.

Fujikoshi et al., "Modified AIC and Cp in multivariate linear regression", Oxford Journals, Mathematics & Physical Sciences, Biometrika, vol. 84, Issue 3, pp. 707-716, Sep. 1, 1996.

Granger, "Testing for Causality", Journal of Economic Dynamics and Control 2 (1980) pp. 329-352, Jun. 1980.

Harville, "Matrix Algebra From a Statistician's Perspective", Springer, 1997.

Huang et al., "Learning with Structured Sparsity", Proceedings of the 26th Annual International Conference on Machine Learning, 2009, pp. 417-424.

Joachims, "Structured Output Prediction with Support Vector Machines", Springer-Verlag Berlin Heidelberg 2006, LNCS 4109, pp. 1-7.

Kleinberg, "Authoritative Sources in a Hyperlinked Environment", Proceedings of teh ACM-SIAM Symposium on Discrete Algorithms, 1998, and as IBM Research Report RJ 10076, May 1997.

Lozano et al., "Grouped graphical Granger modeling for gene expression regulatory networks discovery", vol. 25 ISMB 2009, pp. i110-i118, doi:10.1093/bioinformatics/btp199.

Lozano et al., "Group Orthogonal Matching Pursuit for Variable Selection and Prediction", Advances in Neural Information Processing Systems 22, 2009, pp. 1-9.

Mallat et al., "Matching Pursuit With time-Frequency Dictionaries", IEEE Transactions of Signal Processing, Dec. 1993, pp. 1-43.

Meinshausen et al., "High Dimensional Graphs and Variable Selection with the Lasso", The Annals of Statistics, AMS 2000, pp. 1-32.

Melville et al., "Social Media Analytics: Channeling the Power of Blogosphere for Marketing Insight", WIN 2009.

Micchelli et al., "Kernels for Multi-task Learning", In NIPS, 2004.

Obozinski et al., "Mult-task feature selection", Technical Report, Jun. 2006, Department of Statistics, University of California, Berkeley, pp. 1-15.

Page et al., "The PageRank Citation Ranking: Bringing Order to the Web", Technical Report, Stanford Digital Libraries, Jan. 29, 1998, pp. 1-17.

Reinsel et al., "Lecture Notes in Statistics", Springer, Published Sep. 1998.

Ricci et al., "Magic Moments for Structured Output Prediction", Journal of Machine Learning Research, 9 (2008) Dec. 2008, pp. 2801-2846.

Tibshirani, :Regression Shrinkage and Selection via the Lasso, Journal of the Royal Statistical Society, Series B (Methodological), vol. 58, Issue 1 (1996), pp. 267-288., http://www.jstor.org/Sat Feb 15 17:27:37 2003.

Tropp et al., "Algorithms for Simultaneous Sparse Approximation Part I: Greedy Pursuit", Sig. Proc., 86(3), pp. 572-588, 2006, Date: Typeset on Mar. 17, 2005.

Tsochantaridis et al., "Support Vector Machine Learning for Interdependent and Structured Output Spaces", Proceedings of the 21st International Conference on Machine Learning (ICML), pp. 104-112, 2004.

Turlach et al., "Simultaneous Variable Selection", School of Mathematics and Statistics (M019), University of Western Australia, CSIRO Mathematical and Information Sciences, Australia, Sep. 16, 2004.

Wasserman et al., "Social Network Analysis Methods and Applications", Cambridge Univ. Press, 1994.

Yuan et al., "Dimension reduction and coefficient estimation in multivariate linear regression", Journal of the Royal Statistical Society Series B, 60, Part 3, pp. 320-346, (2007).

Yuan et al., "Model selection and estimation in regression with grouped variables", Journal of the Royal Statistical Society Series B, 68, Part 1, pp. 49-67, (2006).

Zhang, "On the Consistency of Feature Selection using Greedy Least Squares Regression", Journal of Machine Learning Research 10 (2009) pp. 555-568, Mar. 2009.

Zhao et al., "Grouped and Hierarchical Model Selection through Composite Absolute Penalties", Department of Statistics, Univ. of California Berkeley, Apr. 17, 2006, pp. 1-36.

"Advection", Wikipedia, http://en.wikipedia.org/wiki/Advection, Nov. 30, 2010, pp. 1-4.

Arg max, http://en.wikipedia.org/wiki/Arg_max, Nov. 22, 2010, pp. 1-2.

"Causality", http://en.wikipedia.org/wiki/Causality, Nov. 22, 2010, pp. 1-17.

"Datasets", http://www.cs.cornell.edu/PROJECTS/KDDCUP/DATASETS.HTML, Sep. 4, 2003, pp. 1-2.

"Divergence theorem", http://en.wikipedia.org/wiki/Divergence_theorem, Nov. 22, 2010, pp. 1-5.

"Finite volume method", http://en.wikipedia.org/wiki/Finite_volume_method, Nov. 30, 2010, pp. 1-4.

"Granger causality", http://en.wikipedia.org/wiki/Granger_causality, Nov. 30, 2010, pp. 1-2.

"Greedy algorithm", http://en.wikipedia.org/wiki/Greedy_algorithm, Dec. 2, 2010, pp. 1-3.

"Lexical analysis", http://en.wikipedia.org/wiki/Lexical_analysis, Dec. 2, 2010, pp. 1-5.

"Likelihood function", http://en.wikipedia.org/wiki/Likelihood_function, Dec. 6, 2010, pp. 1-9.

"Linear least squares", http://en.wikipedia.org/wiki/Linear_least_squares, Dec. 2, 2010, pp. 1-13.

"Matrix norm", http://en.wikipedia.org/wiki/Matrix_norm, Dec. 2, 2010, pp. 1-5.

"Moore-Penrose pseudoinverse", http://en.wikipedia.org/wiki/Moore-Penrose_pseudoninverse, Dec. 2, 2010, pp. 1-8.

"Multivariate adaptive regression splines", http://en.wikipedia.org/wiki/Multivariate_adaptive_regression_splines, Dec. 2, 2010, pp. 1-8.

"Multivariate probit", http://en.wikipedia.org/wiki/Multivariate_probit, Dec. 2, 2010, p. 1.

"Non-negative matrix factorization", http://en.wikipedia.org/wiki/Non-negative_matrix_factorization, Dec. 2, 2010, pp. 1-6.

Phenomenology (science), http://en.wikipedia.org/wiki/Phenomenology_(science), Nov. 22, 2010, pp. 1-3.

"Regression analysis", http://en.wikipedia.org/wiki/Regression_analysis, Dec. 2, 2010, pp. 1-9.

Restriction (mathematics), http://en.wikipedia.org/wiki/Restrition_(mathematics), Dec. 6, 2010, p. 1.

"Source-sink dynamics", http://en.wikipedia.org/wiki/Source-sink_dynamics, Dec. 2, 2010, pp. 1-6.

"Sparse matrix", http://en.wikipedia.org/wiki/Sparse_matrix, Dec. 6, 2010, pp. 1-5.

"Stemming", http://en.wikipedia.org/wiki/Stemming, Dec. 2, 2010, pp. 1-9.

"Stop words", http://en.wikipedia.org/wiki/Stop_words, Dec. 2, 2010, p. 1.

"Taxicab geometry", http://en.wikipedia.org/wiki/Taxicab_geometry, Dec. 2, 2010, pp. 1-3.

Trace (linear algebra), http://en.wikipedia.org/wiki/Trace_(linear_algebra), Dec. 6, 2010, pp. 1-8.

"Vector autoregression", http://en.wikipedia.org/wiki/Vector_autoregression, Dec. 2, 2010, pp. 1-6.

"Web 2.0", http://en.wikipedia.org/wiki/Web_2.0, Dec. 2, 2010, pp. 1-10.

"Web crawler", http://en.wikipedia.org/wiki/Web_crawler, Dec. 2, 2010, pp. 1-12.

Lozano et al., "Spatial-temporal Causal Modeling for Climate Change Attribution", IBM T.J. Watson Research Center, Yorktown Heights, NY 10598, KDD'09, Jun. 28-Jul. 1, 2009, Paris, France.

Office Action dated Dec. 10, 2012 received in a related U.S. Appl. No. 12/960,131.

* cited by examiner

MULTIVARIATE GRANGER CAUSAL MODELING

INPUT: BLOGGER'S CONTENT DATA $\{\mathbf{B}_j^t\}_{j=1,...,G; t=1,...,\tau}$ FOR G BLOGGERS OVER A DICTIONARY OF K WORDS, WHERE $\mathbf{B}_j^t$ IS THE K-DIMENSIONAL WORD FREQUENCY VECTOR AT TIME $t$ FOR BLOGGER $B_j$, i.e. $\mathbf{B}_j^t = [w_j^{1,t}, ..., w_j^{K,t}]$.

INPUT: THE MAXIMUM LAG TO BE CONSIDERED $d$.

INPUT: A MULTIVARIATE REGRESSION METHOD WITH VARIABLE SELECTION, MGOMP.

INITIALIZATION OF THE $G \times G$ ADJACENCY MATRIX $\mathbf{M}_A$ FOR THE G BLOGGERS (e.g. BY SETTING ALL OF ITS ENTRIES TO ZERO).

$$\text{LET } \mathbf{X} = \begin{pmatrix} \mathbf{B}_1^{\tau-1} & \cdots & \mathbf{B}_1^{\tau-d} & \cdots & \mathbf{B}_G^{\tau-1} & \cdots & \mathbf{B}_G^{\tau-d} \\ \mathbf{B}_1^{\tau-2} & \cdots & \mathbf{B}_1^{\tau-1-d} & \cdots & \mathbf{B}_G^{\tau-2} & \cdots & \mathbf{B}_G^{\tau-1-d} \\ \vdots & & \vdots & & \vdots & & \vdots \\ \mathbf{B}_1^d & \cdots & \mathbf{B}_1^1 & \cdots & \mathbf{B}_G^d & \cdots & \mathbf{B}_G^1 \end{pmatrix}$$

{ INPUT VARIABLE GROUP FOR BLOGGER B1 } ... { INPUT VARIABLE GROUP FOR BLOGGER BG }

FOR EACH BLOGGER $B_j \in \{B_1, ..., B_G\}$, LET $\mathbf{Y} = [(\mathbf{B}_j^\tau)^T, (\mathbf{B}_j^{\tau-1})^T, ..., (\mathbf{B}_j^{1+d})^T]^T$ //APPLY A VARIABLE SELECTION METHOD FOR REGRESSION ON OUTPUT GROUPS $\{\mathbf{B}_j^t\}_{j=1,...,G}$ IN TERMS OF INPUT GROUPS $\{\{\mathbf{B}_j^{t-l}\}_{l=1}^{d}\}_{j=1}^{G}$ (SUBPROCEDURE VARSEL)
$Q = \text{VARSEL}(X,Y)$ WHERE $Y = [Y_1,...Y_G]$ AND Q IS THE OUTPUT REGRESSION COEFFICIENT MATRIX FOR EACH BLOGGER PAIR $(Bi,Bj)$ SET $\mathbf{MA}[i,j] = s(\mathbf{Q}_{li,Oj})$, WHERE $(\mathbf{Q}_{li,Oj})$ DENOTES THE SUBMATRIX FORMED BY THE COEFFICIENTS IN Q CORRESPONDING TO THE INPUT VARIABLES FOR Bi AND TO THE REGRESSIONS FOR Bj, AND $s(.)$ DENOTES A REAL VALUED FUNCTION ON MATRICES (e.g. THE FROEBENIUS NORM)

OUTPUT: THE WEIGHTED ADJACENCY MATRIX MA FOR THE G BLOGGERS AND THE REGRESSION COEFFICIENTS FOR THE MULTIVARIATE REGRESSION

FIG. 4A-2

SUBPROCEDURE VARSEL

IMPLEMENTATION #1

% RUN MG-OMP REGRESSING FOR G OUTPUT GROUPS $\{\mathbf{B}_j^t\}_{j=1,\ldots G}$ IN TERMS OF % G INPUT GROUPS $\{\{\mathbf{B}_i^{t-l}\}_{l=1}^d\}_{i=1}^G$

OUTPUT: Q=MG-OMP(X,Y)

FIG. 4B-1

IMPLEMENTATION #2

FOR EACH BLOGGER $B_j \in \{B_1,\ldots, B_G\}$, DO
   % RUN MG-OMP REGRESSING A SINGLE OUTPUT GROUP $\mathbf{B}_j^t$ IN
   % TERMS OF INPUT GROUPS $\{\{\mathbf{B}_i^{t-l}\}_{l=1}^d\}_{i=1}^G$
   $Q_j$=MG-OMP(X,Y$_j$)
END FOR
OUTPUT: Q=[Q$_1$,...,Q$_G$]

FIG. 4B-2

HYPERLINK GRAPH

CAUSAL GRAPH

INFERRING INFLUENCE AND AUTHORITY

RELATED APPLICATIONS

The present application is filed concurrently with U.S. patent application Ser. No. 12/960,131; "GROUP VARIABLE SELECTION IN SPATIOTEMPORAL MODELING," Inventors A. C. Lozano and V. Sindhwani, which is incorporated herein by reference.

BACKGROUND

The present disclosure relates to identifying authorities within a community, and to the use of machine learning to achieve that task.

One context in which it is useful to identify sources of authority is online social networks. The emergence of the web2.0 phenomenon has set in place a planetary-scale infrastructure for rapid proliferation of information and ideas. Social media platforms such as blogs, twitter accounts, and online discussion sites are large-scale forums where every individual can voice a potentially influential public opinion. According to recent surveys a massive number of internet users are turning to such forums to collect recommendations and reviews for products and services shaping their choices and stances by the commentary of the online community as a whole.

A traditional approach to organizing network information is ranking web-pages in a hyperlinked environment. Examples include PageRank from Page, L., Brin, S., Motwani, R., and Winograd, T., "The pagerank citation ranking: Bringing order to the web," *Tech. Rep., Stanford Digital Libraries*, 1998. And Hubs-and-Authorities per Kleinberg, Jon M. "Authoritative sources in a hyperlinked environment," *Journal of the ACM*, 46:668-677, 1999.

SUMMARY

The inventors have identified the following problems, which fall into this field:

Which members in a community, e.g. which blogs or twitter accounts, should a consumer follow in order to get a gist of the community opinion as a whole?

How can a company identify members (e.g. bloggers) whose commentary can change brand perceptions across this universe, so that marketing interventions—e.g. per Melville, P., Sindhwani, V., and Lawrence, R. Social media analytics: Channeling the power of the blogosphere for marketing insight. *WIN*, 2009—can be effectively strategized?

Other contexts with similar issues include phenomenological systems, such as biological systems, where genes, population features, or ecosystem features can be viewed as authorities governing behavior of aspects of the system;

academic publications, where some authorities influence others.

In each case, though, computer based modeling is intended to be the implementation, rather than the blogs, the systems, or the publications themselves. Improved organizational approaches to information would be desirable in identifying authority.

It is desirable to distinguish influencers and authorities in communities.

In one embodiment, a computer method includes carrying out operations on at least one data processing device. The operations include interfacing with a plurality of records of content originating from a human purveyor of information. The operations further include inferring at least one non-explicit causal relationship among at least two sets of records based on temporal sequence of appearance of content. The operations further include identifying influence relationship among originating community members, each associated with a set of records.

In another embodiment, a computer program product for identifying influence may include a storage medium readable by a processing circuit and storing instructions to be run by the processing circuit for performing a method as indicated in the preceding paragraph.

In yet another embodiment, a system may include at least one medium for storing data;

at least one interface for gathering data and supplying outputs;

at least one processing device for carrying out operations, the operations including the aforementioned method.

Further objects and advantages will become apparent in the following.

BRIEF DESCRIPTION OF FIGURES

Embodiments will now be described by way of non-limiting example with respect to the following figures.

FIG. 4a-1 is a flowchart showing ranking of results of MGCM.

FIG. 4a-2 shows an algorithm called Multivariate Granger Causal Modeling ("MGCM").

FIG. 4b-1 shows a first embodiment of the subprocedure VARSEL in the MGCM algorithm.

FIG. 4b-2 shows a second embodiment of the subprocedure VARSEL.

FIG. 6b shows a hyperlink graph relating to the same data of FIG. 6a.

DETAILED DESCRIPTION

Figure 1:
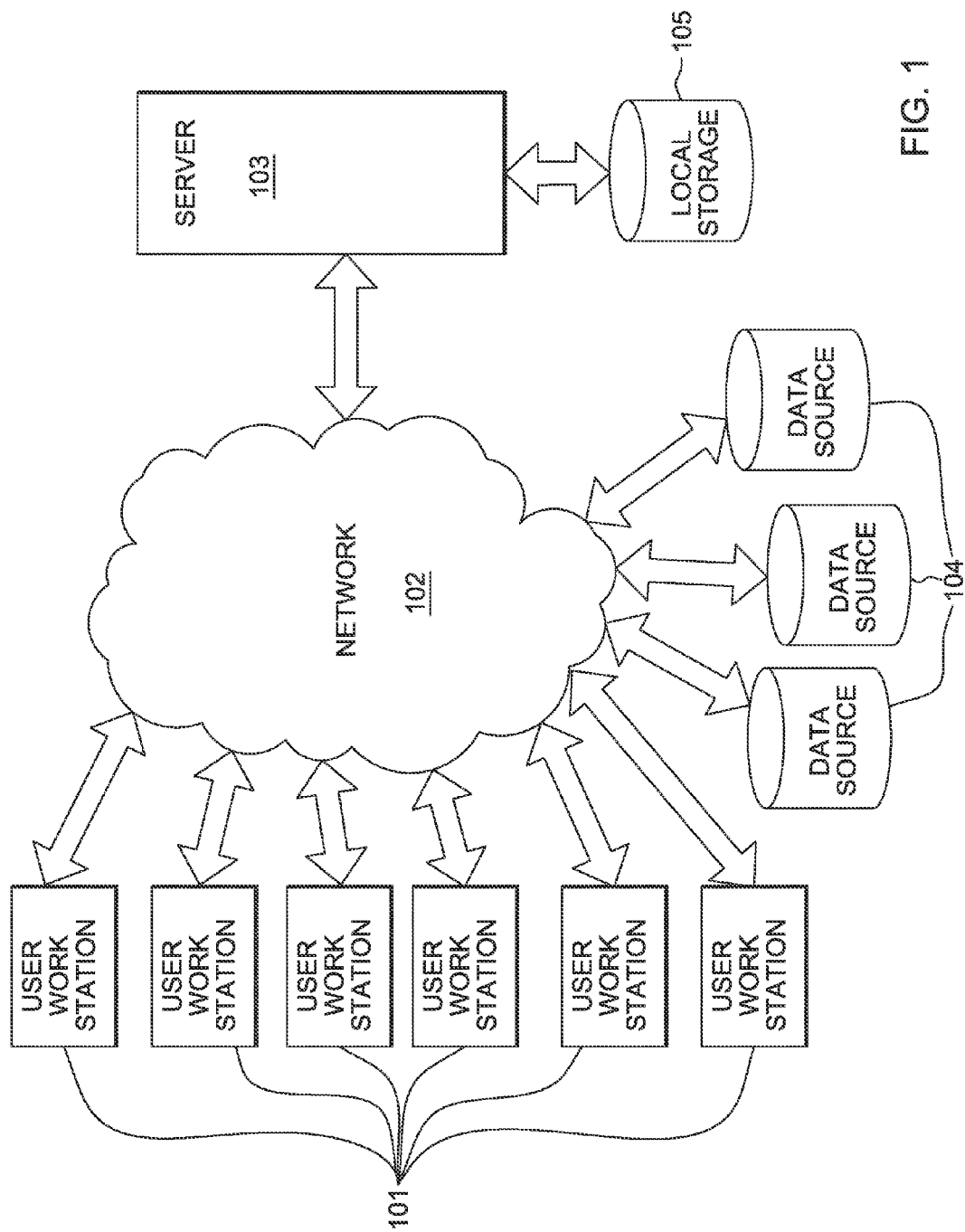
FIG. 1 is a schematic of an environment in which the invention may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows a system in which the invention may be implemented. A plurality of user work stations 101 are coupled via an optional network 102 to at least one server 103. Records of communications within the system may be kept in various places such as data bases maintained by providers [not shown], data sources at 104, or storage 105 local to server 103. This drawing is not intended to imply limitations on numbers or types of components. For instance, user work stations might be of any suitable sort, such as personal computers, cell phones, personal digital assistants, or televisions with set top boxes. The network might be the Internet or some other network such as a Local Area Network (LAN) within an organization. The server might also be of any suitable sort. There might be more or less of any illustrated component and multiple types of components might be used together. Additional components, not shown, may be present. Processing might be located in one machine or distributed over a number of locations.

In prior systems, relationships between content were discerned by explicit markings, such as hyperlinks in the online environment or citations in the print environment. Herein the term "non-explicit" will be used to distinguish that type of system, in other words relationships will be discerned from other aspects of the content.

The term "causal" herein means something less than "cause." Something may be "causal" if it is suspected of being a cause or behaves like a cause, even if it is not in fact the cause.

The term "originating community member" will be used herein to mean an entity associated with a set of content. For instance, a blogger or author can be an originating community member with respect to words or an element of a phenomenological system can be an originating community member with respect to gathered data. An originating community member can be considered causal with respect to another community member. When the originating community member is a causal person, that person can be regarded as an "authority".

The term "jointly" as used herein means that the influence of all the bloggers on each other is assessed based on a joint consideration of all bloggers into a joint model, rather than performing isolated pair-wise tests between pairs of bloggers disregarding the presence and impact of other bloggers. As described below with respect to FIG. 4, this joint consideration of all bloggers may involve a loop over all the bloggers, where at each iteration one focuses on a specific blogger and the influence of all the bloggers is jointly assessed on the specific blogger under consideration, rather than literal joint processing.

The term "simultaneous" as used herein need not mean literally simultaneously. It means that a group of regressions are modeled together, using the same set of input variable groups as predictors for the group of regressions, and where the decision of whether to include or exclude input variable groups in the aforementioned set is made jointly for the whole regression group.

While it is desired herein to consider the content of each blogger "as a whole" in determining influence, this concept is not intended to exclude the possibility that certain trivial words such as "the" or "to" might be filtered out.

It would appear that the mechanics of opinion exchange and adoption would make the problem of inferring authority and influence in social media settings somewhat different from the problem of ranking generic web-pages. Certainly, PageRank and other graph-based measures (Wasserman, S. and Faust, K. *Social Network Analysis*. Cambridge Univ. Press, 1994) can be computed on a hyperlink graph between bloggers to obtain an authority ranking; however, explicit citations in the form of hyperlinks cannot capture the much larger degree of implicit endorsement of opinions.

Consider the following example that typifies the process of opinion adoption. A consumer is looking to buy a laptop. She initiates a web search for the laptop model and browses several discussion and blog sites where that model has been reviewed. The reviews bring to her attention that, among other nice features, the laptop also has excellent speaker quality. Next she buys the laptop and in a few days herself blogs about it. Arguably, conditional on being made aware of speaker quality in the reviews she had read, she is more likely to herself comment on that aspect without necessarily attempting to find those sites again in order to link to them in her blog. In other words, the actual post content is the trace that the opinion was implicitly absorbed, rather than a link to the original opinion. Moreover, the temporal order of events in this interaction is indicative of the direction of causal influence.

A method of formalizing these intuitions is in terms of the notion of *Granger Causality* (Granger, C. Testing for causality: A personal viewpoint. *Journal of Economic Dynamics and Control*, 2:329-352, 1980). Introduced by the Nobel Prize winning economist, Clive Granger, this notion has been used as an operational representation of causality in time series analysis. It is based on the intuition that a cause should precede its effect, and in particular if a time series variable X causally affects another Y, then the past values of X should be helpful in predicting the future values of Y, beyond what can be predicted based on the past values of Y alone.

A number of concepts will be introduced herein. These include:
- mapping the authority problem to that of inferring causal influence relationships;
- extending the notion of Granger Causality to operate on a collection of multiple time series variables representing the evolving textual content of a community of bloggers.
- using blog communities to concretize ideas that hold more generally to a wider class of spatiotemporal causal modeling settings. Examples from the wider class include finding causal influence relationships amongst authors of scientific papers, genes from single or cross-species for which one wishes to identify the regulatory mechanisms, populations with certain characteristics (e.g. children) in which one seeks to model the spreading of a disease.
- proposing a method implementing the aforementioned extension of Granger causality, which we refer to as Multivariate Granger Causal Modeling.
- Proposing the use of U.S. patent application Ser. No. 12/960,131, as an embodiment for a subprocedure in the method of Multivariate Granger Causal Modeling.
- outputting a weighted causal graph that encodes influence relationships between bloggers.
- based on properties of this graph, introducing a family of influence measures called GrangerRanks.

For each blogger Bj, it is desirable to determine which bloggers Bi i=1, . . . G are influencing Bj, by performing one multivariate regression for Y in terms of X, where Y and X are defined in FIG. 4, below. Basically Y is the content of blogger j over time, and X is the "lagged" content of all the bloggers over time. So there is one multivariate regression, but using several observations over time. Several observations can be understood as meaning that Y and X have many rows as follows:

The $1^{st}$ row of Y is content for blogger Bj at time t, and the corresponding first row of X is content for all the bloggers at time t-1, . . . t-d.

The $2^{nd}$ row of Y is content of Bj at time t-1 and the $2^{nd}$ row of X is content of all the bloggers at time ((t-1)-1), . . . ((t-1)-d), . . . .

The $k^{th}$ row of Y is content of Bj at time t-(k-1) and the $2^{nd}$ row of X is content of all the bloggers at time ((t-(k-1))-1), . . . ((t-(k-1))-d), . . . Etc.

The term simultaneous then refers to the concept that if a blogger A influences another blogger B, all the content of A should be predictive of all the content of B, though filtering may be used to eliminate overly frequent words. The decision of whether a blogger A is influencing another blogger B is thus based on examining the relevance of all the content of A on all the words of B, "simultaneously"/ at once.

For convenience, the description below is with respect to a community of bloggers, though the proposed methodology applies to a variety of communities (e.g. authors of scientific papers). It is desirable to seek out authorities and influencers that are causal drivers of future discussions and opinions in the community. The following definition is used. It generalizes the notion of Granger Causality, which was originally defined for a pair of time series only, to multiple groups of times series, which are together referred to in the definition as "content":

Granger Causality: A collection of bloggers is said to influence Blogger $B_i$ if their collective past content (e.g. blog posts), together with the past content of Blogger Bi, is predictive of the future content of Blogger $B_j$, more so than the past content of Blogger $B_i$ alone.

Here the notion of Granger causality is generalized. The original definition is for a pair of time series only. Namely the original definition is something like: "Time series A causes times series B if regressing for B in terms of past of A and B is better than regressing for B in terms of past of B alone." The extension includes the combination of two aspects: 1) a "collection" is judged jointly rather than a "single" entity, namely the potential influence of several bloggers on at least one blogger is determined jointly rather than individually for each pair of bloggers, and 2) each entity is composed of multiple time series, rather than a single time series, and hence the aforementioned judgment is based on the simultaneous effect that one entity may have on another entity, namely on multiple time series, rather than on a single time series. This definition can be viewed as spatial in the sense that each blogger's content is formed by multiple words so the various words form the spatial dimension, while the evolution over time leads to the temporal dimension. Accordingly the term "spatiotemporal" causal modeling may be used in conjunction with algorithms or modeling with respect to inferring influence within a community, including those based on this definition.

While Granger Causality is used in the disclosed embodiment, one of ordinary skill in the art might devise embodiments using other types of causality, such as Judea Pearl causality.

Let $B_1 \ldots B_G$ denote a community of G bloggers. To develop the above intuition further, a representation of "content" will be presented and "predictive" will be derived. With each blogger, content variables are associated, which encompass frequencies of words relevant to a topic across time. Specifically, given a dictionary of K words and the timestamp of each blog post, $w_i^{k,t}$ will represent the frequency of the $k^{th}$ word for blogger $B_i$ at time t.

$B_i^t = [w_i^{1,t}, \ldots, w_i^{K,t}]$ will represent the content of blogger $B_i$ at time t $\{B_i^t\}_{i=1,\ldots,G; t=1,\ldots T}$ is a collection of multiple time series, one for each blogger $B_i$, where T is the time span of analysis—serving as an input O: the output o is a causal graph that encodes causal relationships between bloggers.

Figure 2B:
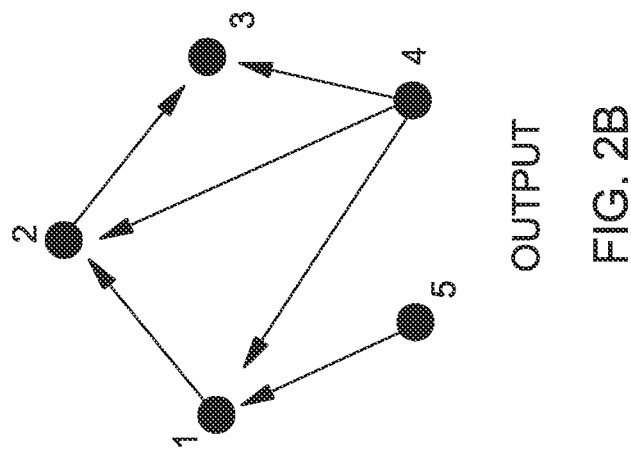
FIG. 2B shows an output graph illustrating influence.
Figure 2A:
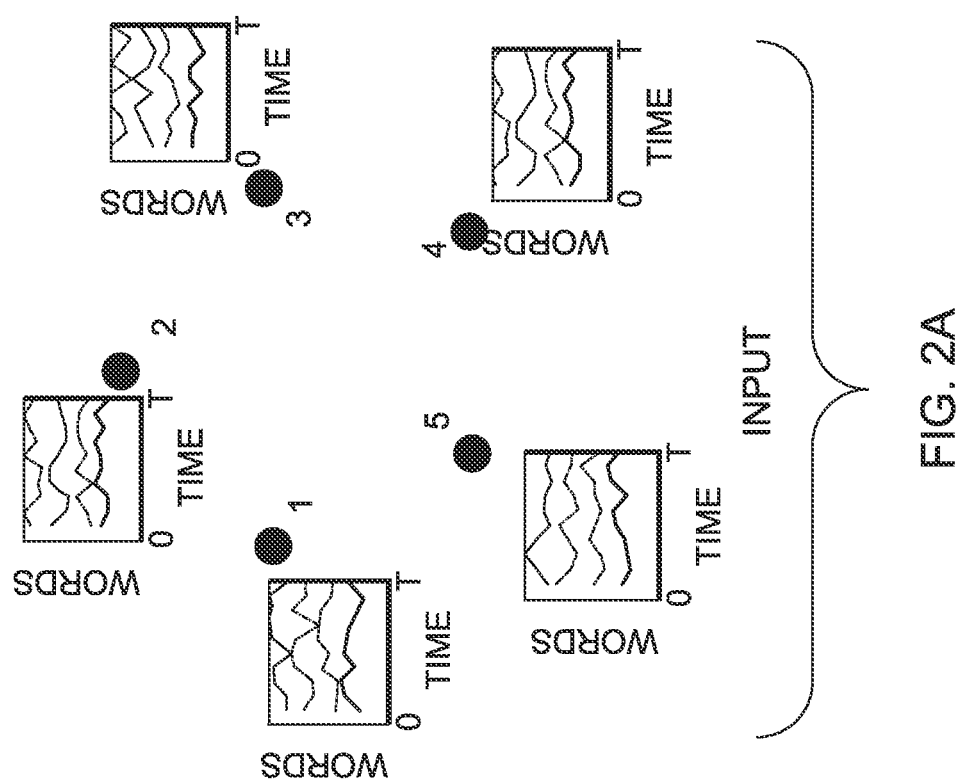
FIG. 2A shows input data in a graphic format.

Input and output are illustrated schematically in FIGS. 2A and 2B.

FIG. 2A is a schematic diagram of five bloggers, numbered 1, 2, 3, 4, and 5. Each is generating various words over a period of time. For simplicity the present embodiment uses word counts at each time point, and does not consider the particular structure of the words into sentences, but such structure might be incorporated into a different embodiment. The evolution of the frequencies of the words over time is measured for each blogger as illustrated by the multiple time series depicted next to each blogger number in the figure. These are not real time series. They are just metaphorical illustrations of what the bloggers are doing. FIG. 2B shows a causal graph that might be output. Each node in the graph represents a blogger, and the edges indicate influence relationship. Specifically, this graph shows blogger 5 influencing blogger 1,
blogger 1 influencing blogger 2,
blogger 2 influencing blogger 3, and
blogger 4 influencing bloggers 1, 2, and 3.

Again, this is not a graph of real data, just a schematic illustration.

The causal graph of FIG. 2B illustrates predicting the bloggers' content variables at time t $\{B_i^t\}_{i=1,\ldots G}$, in terms of the past content of the population, over a time window that is a parameter of the disclosed model. This is a multivariate regression (see L. Breiman and J. H. Friedman, "Predicting multivariate responses in multiple linear regression", Journal of the Royal Statistical Society: Series B, (1), 1997) with GK-dimensional response vector $\{B_i^t\}_{i=1,\ldots G}$, in terms of groups of input variables, $\{B_1^{t-l}\}_{l=1}^d, \{B_2^{t-l}\}_{l=1}^d, \ldots, \{B_G^{t-l}\}_{l=1}^d$, illustrated in FIG. 3. This multivariate regression problem can be solved globally or decomposed by looping over all the bloggers, where, in step j of the loop which corresponds to blogger Bj one considers the sub-problem of predicting Bj's content variables at time t, $B_j^t$, in terms of the past content of the population, over a time window which is a parameter of the disclosed model. At each step j, a multivariate regression with K-dimensional response vector $B_j^t$ in terms of groups of input variables, $\{B_1^{t-l}\}_{l=1}^d, \{B_2^{t-l}\}_{l=1}^d, \ldots, \{B_G^{t-l}\}_{l=1}^d$ is used.

The following makes the extension of Granger causality more precise. A methodology of "Multivariate Granger Causal Modeling" is proposed, which implements the aforementioned extension.

A natural extension of the Granger-causality test would be to assert that blogger $B_i$ influences blogger $B_j$ if the past content of $B_i$ is significantly helpful if predicting the future content of $B_j$, compared to using the past content of $B_j$ alone. More formally, the multivariate regression for $B_j^t$ in terms of $B_j^{t-1}, \ldots, B_j^{t-d}$ and $B_i^{t-1}, \ldots, B_i^{t-d}$ will be compared to the multivariate regression for $B_j^t$ in terms of $B_j^{t-1}, \ldots, B_j^{t-d}$ alone.

However, performing isolated pairwise tests as above rather than jointly encompassing all the bloggers may be suboptimal, since the test is not performed in full view of blogger community and does not incorporate the possible influence from other bloggers.

An alternate approach is to apply regression algorithms with variable selection to estimate the causal graph, e.g. using variants of Lasso, which minimize the usual sum of squared errors plus a penalty on the regression coefficients, see for instance Friedman, J., Hastie, T., and Tibshirani, R., "Sparse inverse covariance estimation with the graphical lasso," Biostatistics, 9(3):432-441, July 2008; Meinshausen, N. and Bühlmann, P., "High-dimensional graphs and variable selection with the Lasso," Ann. Statist. 34 1436-1462, 2006; Yuan, M. and Lin, Y., "Model selection and estimation in regression with grouped variables," Journal of the Royal Statistical Society, Series B, 68:49-67, 2006, all of which are incorporated herein by reference. Such methods have also been successfully applied to infer causal relationships between individual time series data. For instance Lozano, A. C., Abe, N., Liu Y., and Rosset, "S. Grouped graphical granger modeling for gene expression regulatory networks discovery", *Bioinformatics*, vol. 25 (no. 12), 2009 ("Lozano a") addressed the problem of gene regulatory network discovery by applying the Group Lasso algorithm for variable group selection, where the lagged variables are grouped according to the time series to which they belong The use of such variable selection methods should be guided by the fact that it would be more desirable to know whether the past content of blogger B, as a whole is predictive of the future content of blogger rather than whether the frequency for a certain word for $B_i$ is predictive, with a certain time lag, of the frequency of a certain word for $B_j$. Hence the past word frequencies of a given blogger should be treated as an input group, and the selection process should be done with respect to the variable groups, i.e., $\{B_1^{t-l}\}_{l=1}^d, \{B_2^{t-l}\}_{l=1}^d, \ldots, \{B_G^{t-l}\}_{l=1}^d$ rather than the individual variables, i.e., $\{w_i^{k,t-l}, k \in \{1,\ldots,K\}, l \in \{1,\ldots d\}, i \in \{1,\ldots,G\}\}$. This is done within the procedure denoted MG-OMP (namely in the VARSEL subprocedure), which is an iterative procedure including variables one block at a time, rather than one single variable at a time. In addition, it is reasonable to assume that if a blogger $B_i$ influences a blogger $B_j$, the impact of $B_i$ should be felt throughout the entire content of $B_j$. Hence the decision of whether or not to select $B_i$'s past content as predictor for $B_j$'s future content, should be made simultaneously across the K regressions for the word frequencies of in the multivariate regression. That is, the input variable group corresponding to $B_j$ will be either simultaneously included in the K models forming the multivariate regression for $B_j$ (albeit with different regression coefficients for each model), or excluded from all of them, and in that sense the target variables in the regressions for Bj will be treated as an output group.

Figure 3:
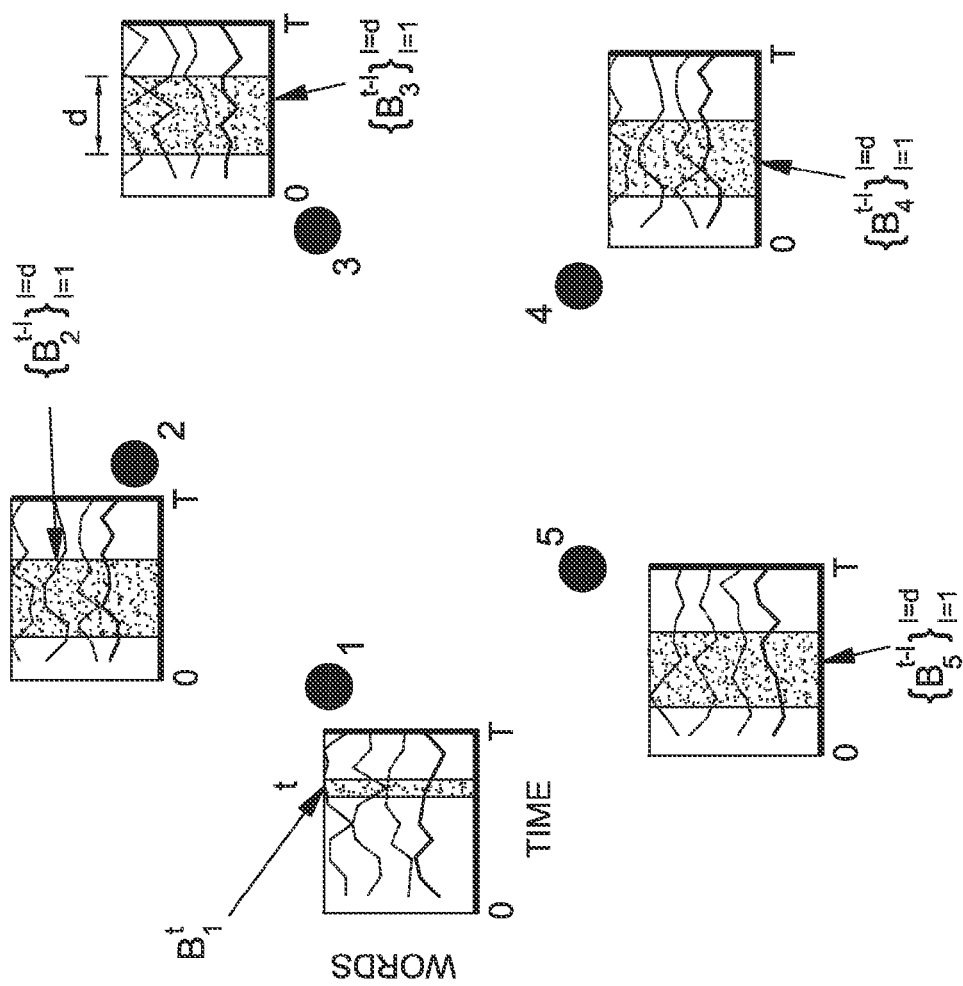
FIG. 3 shows an output variable group, and input variable groups for multivariate (multiple-output) regression.
Figures 1, 4A:
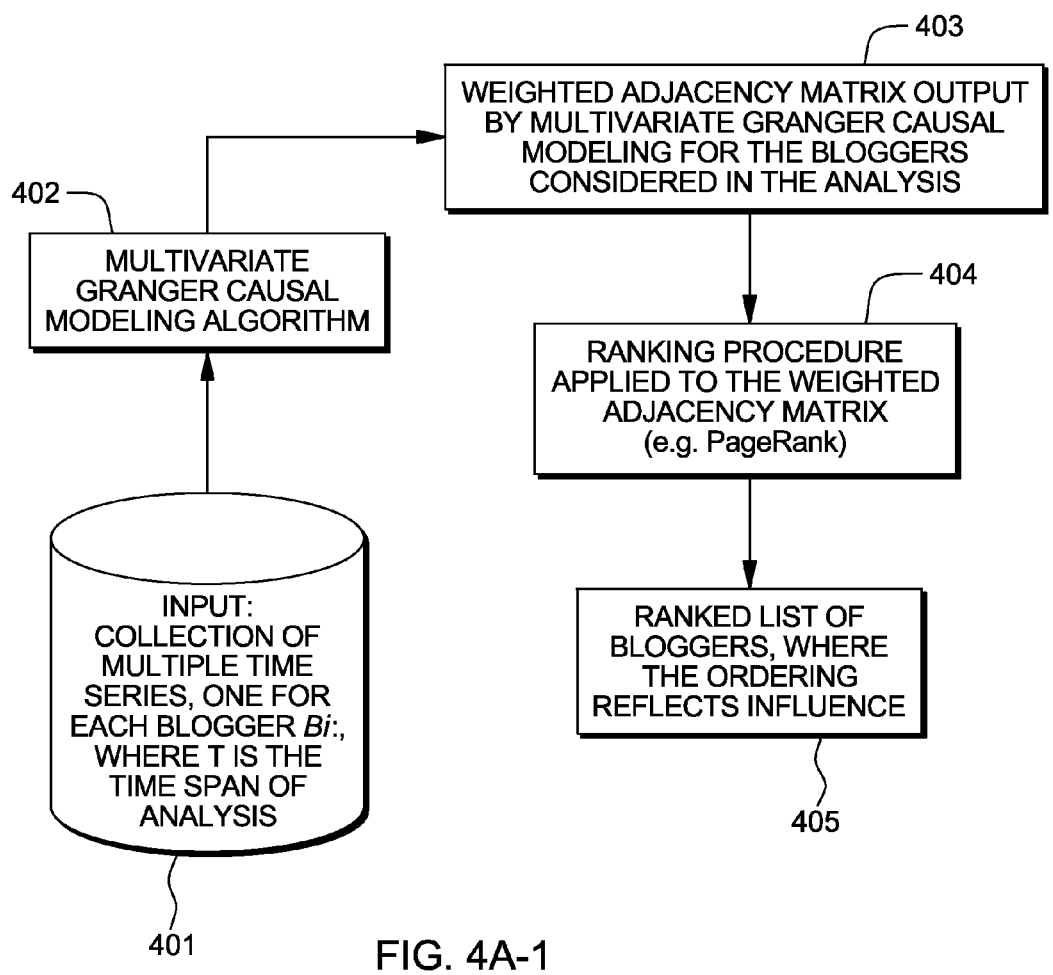

FIG. 4a-1 shows an overview flowchart of an embodiment. At 401, inputs, as schematized in FIG. 3, are provided. At 402, the Multivariate Granger Causal Modeling ("MGCM") is applied to the inputs. The output of MGCM at 403 is a weighted adjacency matrix for the bloggers considered in the analysis. At 404 a ranking procedure is applied to the weighted adjacency matrix. At 405 a ranked list of bloggers is output, where the order reflects influence.

Algorithm 1, shown in FIG. 4a-2, which describes the generic procedure of MGCM. The procedure takes observations of the content data for the G bloggers as input. It outputs an adjacency matrix describing the inferred causal graph between bloggers: each node corresponds to a blogger, and an edge from $B_i$ to $B_j$ indicates that blogger $B_i$ influences blogger $B_j$. It also returns the regression coefficients of the underlying regressions, which can then be used to assess the strength of the uncovered causal relationships, as indicated in the section marked Granger Ranks below. The use of the subprocedure denominated Multivariate Group Orthogonal Matching Pursuit ("MG-OMP"), incorporated by reference above, is proposed as part of a preferred embodiment for the variable selection subprocedure, denoted by VARSEL in FIG. 4a-2. The reason for this is that MG-OMP is a method for multivariate regression that performs variable block selection, where the blocks are defined by specifying input variables groups and output variable groups. It is thus able to take into account the input and output group structures naturally defined by each blogger's content. The influence relationships between bloggers is then assessed at the overall content level for the candidate predictors (via variable block selection), as well as for each target blogger (via simultaneous selection within the output groups corresponding to each target blogger from the multivariate regression).

More precisely, in VARSEL, MG-OMP can be applied once for the whole population, considering G output variable groups, namely, one for each blogger's future content, and G input variable groups, namely one for each blogger's past content. This is described in FIG. 4b-1. Alternatively one may apply MG-OMP G times, once per blogger, as shown in FIG. 4b-2, considering at each application a single output variable group, namely the future content of the blogger under consideration, and G input variable groups, namely one for each blogger's past content. For each blogger $B_j$, either of these ways can be viewed as an application of a Granger test on $B_j$ against bloggers $B_1, B_2, \ldots, B_G$. One can then conclude that a certain blogger $B_i$ influences blogger $B_j$, if the input variable group $\{B_i^{t-l}\}_{l \in \{1, \ldots, d\}}$ is selected for the output variable group corresponding to Bj by the variable selection method of U.S. patent application Ser. No. 12/960,131.

GrangerRanks

The weighted adjacency matrix of the causal graph (the output MA of Algorithm 1), naturally induces a family of influence measures that will be called GrangerRanks. This family considered at 404 includes the following measures studied.

1. GrangerOutDegree: Rank vertices (bloggers) according to the weighted outdegree of the weighted adjacency matrix. More precisely, for each blogger Bi, compute the sum of the entries in the weighted adjacency matrix that departs from Bi, then rank the bloggers according to the aforementioned sum, so that the larger the sum, the higher the rank. Analogously a Granger InDegree ranks vertices according to the weighted indegree of the weighted adjacency matrix.
2. GrangerPageRank: Ranks vertices (bloggers) according to the PageRank scores computed from the weighted adjacency matrix. More precisely, apply the PageRank algorithm using the weighted adjacency matrix as input, then rank the bloggers according to the scores output by Pagerank.

Other natural possibilities include causality based extensions of Kleinberg's HITS algorithm Kleinberg, Jon M. Authoritative sources in a hyperlinked environment. *Journal of the ACM*, 46:668-677, 1999 (ranking web-pages in a hyperlinked environment) and other measures proposed in the social network analysis literature Wasserman, S. and Faust, K. *Social Network Analysis*. Cambridge Univ. Press, 1994. The HITS algorithm, developed by Jon Kleinberg in 1999 in the context of ranking webpages, may be seen as an alternative to the PageRank for hyperlink analysis. It computes two scores (authority and hub) for each node of a hyperlink graph with the intuition that there exist a set of "hub pages" that link to multiple authoritative pages. It implements the mutually reinforcing relationship that good hubs point to good authorities and a good authority is a page that is pointed to by many good hubs. Computationally, HITS computes the dominant left and right singular vectors of the graph adjacency matrix. It was originally proposed as a query specific ranking method which is applied to hyperlinked documents that match a user query.

Empirical Studies

Three experiments were conducted representing increasingly realistic settings. The first used a simulated dataset where blogger content data were generated as per a known causal graph. This setting seeks to directly validate how well the model presented herein recovers the underlying graph. The second example used a dataset consisting of research papers in high-energy physics made publicly available, originally in the context of a data mining competition called "KDD Cup 2003". In this academic publishing setting, the citation count is generally accepted as a measure of authority of an author. Herein GrangerRank is compared against the citation count to measure how well GrangerRank aligns with the more common measure in this domain. Finally, an example of industrial application of the model presented herein is used to track influencers in blog communities posting content relevant to a software brand.

Simulated Datasets

Vector Auto-Regressive ("VAR") models (c.f. (Enders, W., *Applied Econometric Time Series*, John Wiley & Sons, 2003)) were used to construct simulated datasets. Specifically, $B^t$ denotes the vector resulting from the concatenation of all the bloggers' content at time t, i.e.

$$(B^t)^T = [B_1^t, \ldots, B_C^t].$$

Then a VAR model is expressed as $$B^t = A_1 \cdot B^{t-1} + \ldots + A_d \cdot B^{t-d} + \text{noise}$$

where $A_1$ is a (KG)×(KG) coefficient matrix over all the bloggers' word frequency variables, for lag l=1, ..., d. In experiments, a G×G adjacency matrix was randomly generated that determined the structure of the "true" blogger's network. Then for each edge from $B_i$ to B, the coefficients in the matrices $A_1$ were randomly assigned for the entries whose columns correspond to the word frequencies of $B_i$ and whose rows correspond to the word frequencies of $B_j$. The model thus obtained was then applied on a random initial vector to generate time series data $\{X_t\}_{t=1,\ldots,\tau}$ of a specified length $\tau$. The adjacency matrix is over the bloggers, corresponding to the idea that the true causal structure is at the level of the bloggers, rather than the individual lagged word frequency variables. In each experiment, the true adjacency matrix was generated using an affinity (i.e., the probability that each edge is included in the bloggers graph) chosen randomly uniformly between 0.01 and 1 (to vary the sparsity of the true graph). The coefficients of the VAR model, noise, and initial distribution were sampled according to normal distributions with mean 0 and standard deviation 0.25, 0.1, 0.1, respectively. The following values are set: G=20, K=10, d=5, and $\tau$=100. The performance of Multivariate Granger Causal Modeling ("MGCM"), is evaluated using precision P, recall R and F1 measure $$F_1 = \frac{2PR}{(P+R)},$$

over 20 runs, viewing the causal modeling problem as that of predicting the inclusion of the edges in the true graph. More precisely, letting A* denote the target adjacency matrix, Â the output adjacency matrix, and V×V the set of feature pairs, precision P and recall R are defined as follows:

$$P = \frac{|\{(i, j) \in V \times V : \hat{A}[i, j] = A * [i, j]\}|}{|\{(i, j) \in V \times V : \hat{A}[i, j] = 1\}|}$$

$$R = \frac{|\{(i, j) \in V \times V : \hat{A}[i, j] = A * [i, j]\}|}{|\{(i, j) \in V \times V : \hat{A} * [i, j] = 1\}|}$$

The F1 measure, Precision and Recall are accuracy scores between 0 and 1. The closer these are to 1, the better. The results, presented in table below confirm the effectiveness of the "MGCM" method in recovering underlying blogger graphs, as average F1 measure, precision and recall obtained in experiments are close to 1.0.

| Method | $F_1$ measure | Precision | Recall |
| --- | --- | --- | --- |
| MGGCM | 89.5% (±0.4%) | 91.7% (±1%) | 88.7% (±1%) |

Influencers in Theoretical Physics

Dataset Description: Drawn from a dataset provided as part of the data mining competition, "KDD Cup 2003", this dataset is publically available at: http://www.cs.cornell.edu/projects/kddcup/datasets.html. It contains the latex sources of all papers in the hepth portion of the arXiv (http://arxiv.org) until May 1, 2003. These are 29555 theoretical papers in high energy physics. The upload date for each paper is also available. Also available is the citation graph between papers. Data was processed as follows: the unix utility detex was used to strip all latex elements and extract the textual content from each document. Next the documents were tokenized and document-term matrices were constructed over a vocabulary of words satisfying the following criteria: (a) contain more than 2 but less than 50 characters, (b) document frequency is more than 10, (c) not present in a stopword dictionary. No stemming was done in order to preserve the technical language. These criteria resulted in 43691 words. The authors for each paper were obtained by parsing pre-processed XML attributes available from: http://kdl.cs.umass.edu/data/hepth/hepth-info.html. In total, there were 9200 unique author names. 41 papers had timestamps before the start of the year 1992. These were removed, resulting in 29514 documents.

In consultation with a theoretical physicist, analysis used a time granularity of 1 month. In total, the data spans 137 months. Unsupervised word selection was done as follows. On the original document-term matrix (29514 documents and 43691 words), an NMF topic model was constructed with 50 topics. For each topic, the top 10 words were identified. Across the 50 topics, this resulted in a smaller vocabulary of 463 words. For each of the 9200 authors, a word-time matrix of size 463×137 was created, which was the usage of the topic-specific key words across time. One year, i.e., d=12 months was used as maximum time lag.

Figure 5:
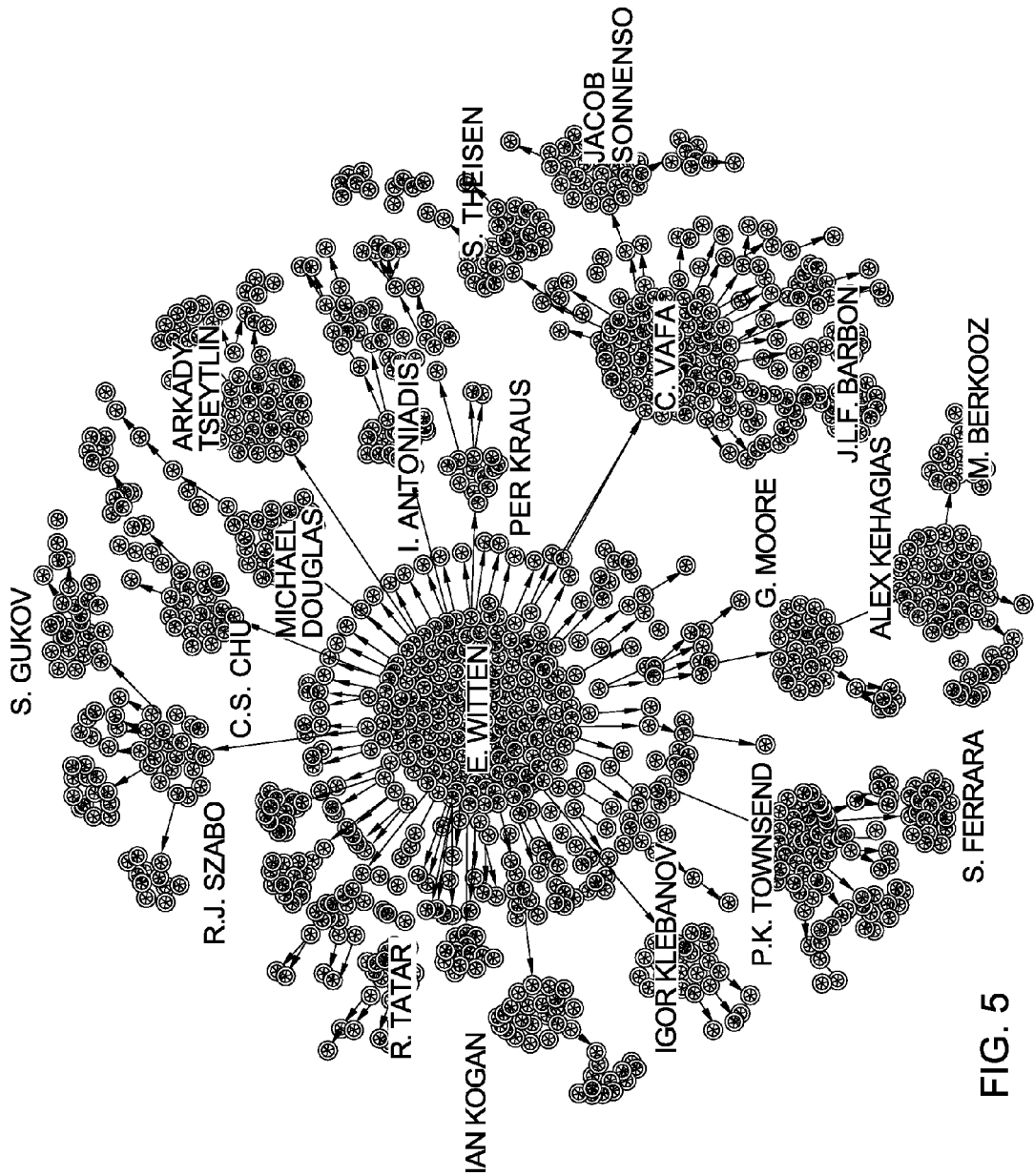
FIG. 5 shows a causal graph of influencers in the field of theoretical physics.

Results:

The model disclosed herein resulted in the causal graph shown in FIG. 5 showing influence relationships amongst high energy physicists. Table 1 below lists the top 20 authors according to Granger-OutDegree (also marked on the graph), GrangerPager-Rank and Citation Count.

TABLE 1

| GrangerOutdegree | GrangerPageRank | Citation Count |
| --- | --- | --- |
| E. Witten | E. Witten | E. Witten |
| C. Vafa | C. Vafa | N. Seiberg |
| Alex Kehagias | Alex Kehagias | C. Vafa |
| Arkady Tseytlin | Arkady Tseytlin | J. M. Maldacena |
| P. K. Townsend | P. K. Townsend | A. A. Sen |
| Jacob Sonnenschein | Jacob Sonnenschein | Andrew Strominger |
| Igor Klebanov | R. J. Szabo | Igor Klebanov |
| R. J. Szabo | G. Moore | Michael Douglas |
| G. Moore | Igor Klebanov | Arkady Tseytlin |
| Michael Douglas | Ian Kogan | L. Susskind |
| Ian Kogan | Michael Douglas | J. Polchinski |
| C. S. Chu | C. S. Chu | P. K. Townsend |
| I. Antoniadis | S. Gukov | S. Gubser |
| S. Gukov | I. Antoniadis | S. Ferrara |
| S. Theisen | S. Ferrara | G. Moore |
| S. Ferrara | S. Theisen | M. Cvetic |
| M. Berkooz | M. M. Sheikh-Jabbari | Tom Banks |
| J. L. F. Barbon | M. Berkooz | H. Ooguri |
| Per Kraus | J. L. F. Barbon | R. E. Kallosh |
| R. Tatar | Per Kraus | Christopher M. Hull |

The model identified several leading figures such as Edward Witten, Cumrun Vafa, Arkady Tseytlin, Igor Klebanov, P. K. Townsend as authorities in theoretical physics, comparably to the citation count technique.

In this domain, number of citations is commonly viewed as a valid measure of authority given disciplined scholarly practice of citing prior related work. Thus, citation-count based ranking is considered as the standard for comparison of new techniques. Table 2 shows that GrangerPageRank and GrangerOutDegree have high positive rank correlation with citation counts. This experiment confirms that the present embodiment is able to identify key influencers in this domain, and is in agreement with how this community recognizes its authorities.

TABLE 2

Rank correlations on Physics dataset.

| Measure | Rank Correlation |
| --- | --- |
| GrangerPageRank vs. CitationCount | 0.728 |
| GrangerOutDegree vs. CitationCount | 0.384 |

IBM Lotus Bloggers

Dataset Description:

A dataset was obtained by crawling blogs pertaining to the IBM Lotus software brand http://www-01.ibm.com/software/lotus/. The crawl process ran in conjunction with a binary classifier classifying posts into either relevant or irrelevant so as to continuously filter out posts irrelevant to Lotus discussions. The top 15000 most relevant lotus posts between Jan. 1, 2009 and Jan. 12, 2010. A document-term matrix was created over a vocabulary of 11050 terms that had document-frequency more than 10, and the usual Porter stemming and stopword removal steps were applied. On this matrix, an unsupervised feature selection procedure selected a smaller set of 96 keywords. This was done by obtaining the top 10 words per topic from a Non-negative Matrix Factorization (NMF) based topic model trained to find 10 document clusters. 192 posts did not contain any of these words and were removed. A graph between posts to blogs in the same collection was also obtained, from which a blogger-blogger citation network was assembled. In all, this dataset represents a Lotus blogging community of 684 bloggers, each associated with multiple time series describing the frequency of 96 words over a time period of 376 days. One week was considered, i.e., d=7 days as maximum time lag.

Figure 6B:
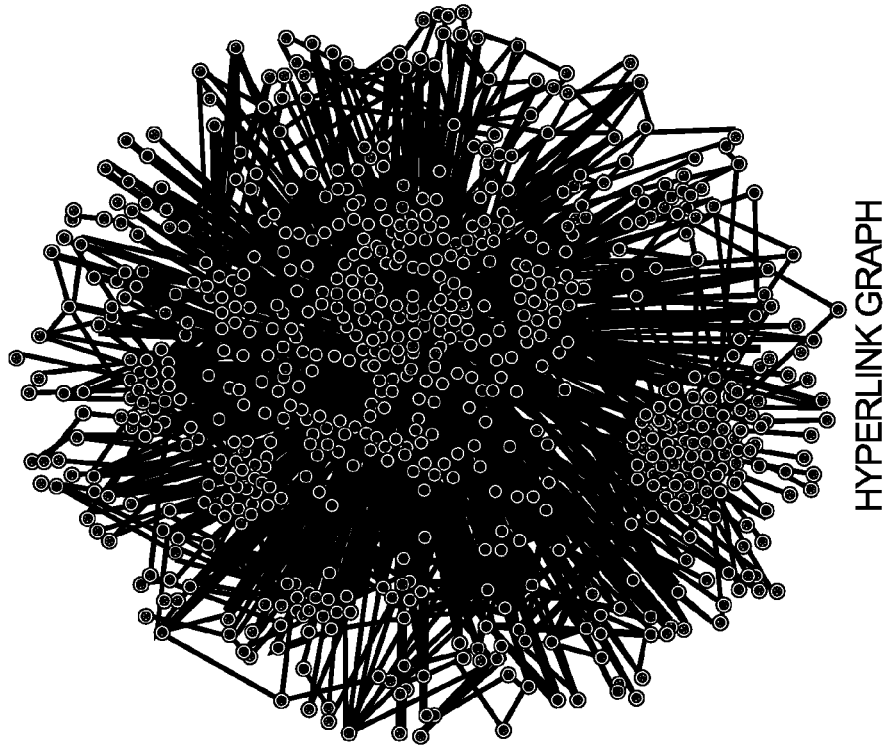
Figure 6A:
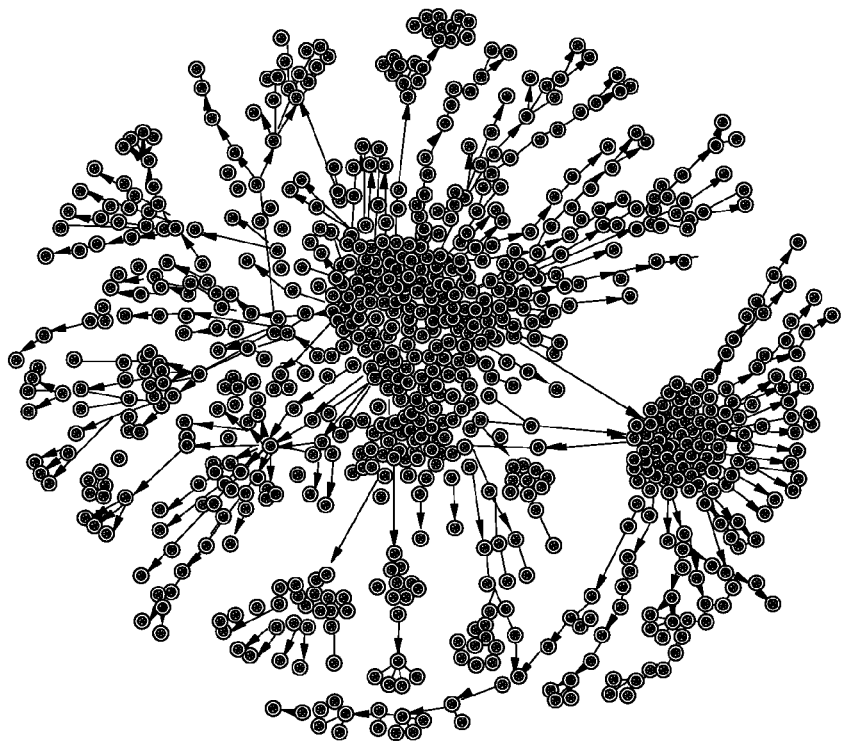
FIG. 6a shows a causal graph of influencers.

Results:

FIG. 6(a) shows the causal graph learnt by the present embodiment on the left, and FIG. 6(b) shows the hyperlink graph on the right. The causal graph is sparser than the hyperlink graph. It would appear that, by identifying fewer and therefore likely more significant causal relationships between bloggers, the causal graphs allow clearer inspection of the authorities and also appear to better expose striking sub-community structures in this blog community.

Table 3 presents rank correlation between PageRank, Indegree and Outdegrees computed over the causal graph and the hyperlink graph. Positive correlations indicate that measures computed on either graph partially capture related latent rankings, but at the same time are also sufficiently different from each other.

TABLE 3

| Measure | Rank Correlation |
| --- | --- |
| GrangerPagerRank & HyperlinkPageRank | 0.44 |
| GrangerOutDegree & HyperlinkInDegree | 0.25 |
| GrangerInDegree & HyperlinkOutDegree | 0.65 |

TABLE 4

| Rank | GrangerPageRank | HyperlinkPageRank |
| --- | --- | --- |
| 1 | http://www.theregister.co.uk | http://www.edbrill.com/ebrill/edbrill.nsf/ |
| 2 | http://www.edbrill.com/ebrill/edbrill.nsf/ | http://www.ns-tech.com/blog/geldred.nsf |
| 3 | http://soa.sys-con.com/ | http://www.switched.com |
| 4 | http://lifehacker.com | http://www.lbenitez.com |
| 5 | http://www.dominoguru.com | http://www.dominopower.com/ |
| 6 | http://communities.vmware.com | http://planetlotus.org/forum/index.php |
| 7 | http://www.heise-online.co.uk | http://www.versiontracker.com/ |
| 8 | http://www.techworld.com | http://www.johndavidhead.com/jhead/johnhead.nsf/ |
| 9 | http://www.eweek.com | http://blogs.toalsys.com/toalsys_blog.nsf |
| 10 | http://www.cmswire.com/ | http://www.dominoguru.com |

Table 4 lists the top 10 bloggers according to GrangerPageRank and HyperlinkPageRank scores. Interestingly, the top authority as per the disclosed model is the British technology news and opinion site The Register, which arguably is less likely to be explicitly linked to as compared to a personal blog site. Ed Brill, a recognized IBM Lotus Blogger, is identified as an authority by both causality and hyperlink based metrics. On Jan. 27, 2010, after the analysis period, he acknowledged press coverage coming from UK, in particular giving an example from The Register.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

From reading the present disclosure, other modifications will be apparent to persons skilled in the art. Such modifications may involve other features which are already known in the field and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof, whether or not it mitigates any or all of the same technical problems as does the present invention. The applicants hereby give notice that new claims may be formulated to such features during the prosecution of the present application or any further application derived therefrom.

The word "comprising", "comprise", or "comprises" as used herein should not be viewed as excluding additional elements. The singular article "a" or "an" as used herein should not be viewed as excluding a plurality of elements. Unless the word "or" is expressly limited to mean only a single item exclusive from other items in reference to a list of at least two items, then the use of "or" in such a list is to be interpreted as including (a) any single item in the list, (b) all of the items in the list, or (c) any combination of the items in the list. Use of ordinal numbers, such as "first" or "second," is for distinguishing otherwise identical terminology, and is not intended to imply that operations or steps must occur in any particular order, unless otherwise indicated.

Where software or algorithms are disclosed, anthropomorphic or thought-like language may be used herein. There is, nevertheless, no intention to claim human thought or manual operations, unless otherwise indicated. All claimed operations are intended to be carried out automatically by hardware or software.

Where software or hardware is disclosed, it may be drawn with boxes in a drawing. These boxes may in some cases be conceptual. They are not intended to imply that functions described with respect to them could not be distributed to multiple operating entities; nor are they intended to imply that functions could not be combined into one module or entity unless otherwise indicated.

The invention claimed is:

1. A computer method comprising carrying out operations on at least one data processing device, the operations comprising:
   interfacing with a plurality of records of content originating from human community members;
   inferring at least one non-explicit causal relationship among at least two sets of records from the plurality of records, based on temporal sequence of appearance of content, the inferring including:
      for the at least two sets of records, calculating an adjacency matrix by using a multivariate granger causal modeling method which uses a matrix norm of a matrix whose elements include regression coefficients corresponding to variables which represent the at least two sets of records; and
   identifying, by using the calculated adjacency matrix, influence relationships among at least two originating community members, each community member associated with a set of records from the at least two sets of records.

2. The method of claim 1, wherein inferring comprises:
   considering for each set time dependent changes in a group of words belonging to that set; and determining whether or not the time dependent changes of any set as a whole are predictive of the time dependent changes of any other set as a whole.

3. The method of claim 2, wherein determining takes into account the contents of the other set as well as of those compared with that other set.

4. The method of claim 2, wherein each group comprises all the words belonging to the respective set.

5. The method of claim 2, wherein inferring comprises performing multivariate regression jointly for the sets of all the members with respect to past values of the sets of all the members.

6. The method of claim 2, wherein inferring comprises looping over each member, and for each member performing multivariate regression for the set corresponding to that member with respect to past values of the sets of all the members.

7. The method of claim 1, wherein each set comprises a set of words created by a person; persons are identified as influencers if the past values taken by their set of words are predictive of the present values of the set of words for other persons.

8. The method of claim 1, comprising outputting an embodiment of a weighted causal graph that encodes influence relationships between sources associated with content.

9. The method of claim 8, comprising, responsive to the graph, deriving a graph based ranking based on social influence measures.

10. The method of claim 9, wherein the influence measures are GrangerRanks.

11. The method of claim 1, wherein the relationship is Granger Causality.

12. The method of claim 1, wherein inferring comprises multivariate regression with variable group selection.

13. The method of claim 1, wherein inferring comprises multivariate regression with simultaneous variable group selection.

14. The method of claim 1, wherein inferring comprises Multivariate Group Orthogonal Matching Pursuit.

15. The method of claim 1, wherein the relationship is Judea Pearl causality.

16. A computer program product for identifying influence, the computer program product comprising:
   a storage medium excluding only a propagating signal, the storage medium readable by a processing circuit and storing instructions to be run by the processing circuit for performing a method comprising:
   interfacing with a plurality of records of content originating from human community members;
   inferring at least one non-explicit causal relationship among at least two sets of records from the plurality of records, based on temporal sequence of appearance of content, the inferring including:
      for the at least two sets of records, calculating an adjacency matrix by using a multivariate granger causal modeling method which uses a matrix norm of a matrix whose elements include regression coefficients corresponding to variables which represent the at least two sets of records; and
   identifying, by using the calculated adjacency matrix, influence relationships among at least two originating community members, each community member associated with a set of records from the at least two sets of records.

17. The program product of claim 16, wherein inferring comprises:
   performing multivariate regression jointly for the sets of all the members with respect to past values of the sets of all the members, which includes:
   considering for each set the time dependent changes in all words from the group of words pertaining to that set as a whole; determining whether or not the time dependent changes of any set are predictive of the time dependent changes of any other set as a whole; each set comprises a set of words created by a person; and
   persons are identified as influencers if their time dependent changes of their sets are predictive of the time dependent changes of other sets.

18. The program product of claim 17, comprising outputting an embodiment of a weighted causal graph that encodes influence relationships between sources associated with content; and responsive to the graph, deriving influence measures.

19. The program product of claim 17, wherein inferring comprises multivariate regression with group variable selection.

20. A system comprising:
   at least one medium for storing data;
   at least one interface for gathering data and supplying outputs;
   at least one processing device for carrying out operations, the operations comprising:
      interfacing with a plurality of records of content originating from human community members;
      inferring at least one non-explicit causal relationship among at least two sets of records from the plurality of records, based on temporal sequence of appearance of content, the inferring including:
         for the at least two sets of records, calculating an adjacency matrix by using a multivariate granger causal modeling method which uses a matrix norm of a matrix whose elements include regression coefficients corresponding to variables which represent the at least two sets of records; and
      identifying, by using the calculated adjacency matrix, influence relationships among at least two originating community members, each community member associated with a set of records from the at least two sets of records.

21. The system of claim 20, wherein the operations comprise outputting an embodiment of a weighted causal graph that encodes influence relationships between sources associated with content; and responsive to the graph, deriving influence measures.

22. The system of claim 21, wherein inferring comprises multivariate regression with group variable selection and joint consideration of all community members.

23. The method of claim 1, wherein the identifying includes:
- for each community member, computing a sum of entries in the adjacency matrix that departs from the each community member;
- ranking the community members according to the sum by which a community member with a larger sum has a higher rank.

* * * * *